US011084549B2

(12) United States Patent
Ghezzi

(10) Patent No.: US 11,084,549 B2
(45) Date of Patent: Aug. 10, 2021

(54) VEHICLE HAVING THREE OR MORE TILTING WHEELS WITH REACTIVE CONSTRAINT SUSPENSION

(71) Applicant: G.P. DI GHEZZI GIUSEPPE, Besana In Brianza (IT)

(72) Inventor: Giuseppe Ghezzi, Villasanta (IT)

(73) Assignee: G.P. DI GHEZZI GIUSEPPE, Besana In Brianza (IT)

( * ) Notice: Subject to any disclaimer, the term of this patent is extended or adjusted under 35 U.S.C. 154(b) by 310 days.

(21) Appl. No.: 16/315,666

(22) PCT Filed: Jul. 7, 2017

(86) PCT No.: PCT/IB2017/054107
§ 371 (c)(1),
(2) Date: Jan. 7, 2019

(87) PCT Pub. No.: WO2018/007992
PCT Pub. Date: Jan. 11, 2018

(65) Prior Publication Data
US 2019/0176921 A1    Jun. 13, 2019

(30) Foreign Application Priority Data

Jul. 8, 2016  (IT) ......................... 102016000071538

(51) Int. Cl.
*B62K 5/10*    (2013.01)
*B62K 5/05*    (2013.01)
(Continued)

(52) U.S. Cl.
CPC .............. *B62K 5/10* (2013.01); *B60G 11/225* (2013.01); *B62K 5/027* (2013.01); *B62K 5/05* (2013.01);
(Continued)

(58) Field of Classification Search
CPC .......... B62K 5/10; B62K 5/027; B62K 25/04; B62K 5/05; B62K 5/08; B62K 2005/001;
(Continued)

(56) References Cited

U.S. PATENT DOCUMENTS 4,043,571 A * 8/1977 Guerbet ................. B60G 11/22
280/124.153
4,360,224 A   11/1982 Sato et al.
(Continued)

FOREIGN PATENT DOCUMENTS

ES         2388059 T3    10/2012

*Primary Examiner* — Darlene P Condra
(74) *Attorney, Agent, or Firm* — Dickinson Wright PLLC

(57) ABSTRACT

The invention describes a vehicle (100) having three or more tilting wheels comprising a main frame (2) provided with a suspension group (3) for at least two wheels (25). The suspension group (3) is joined to the main frame (2) through a hinge (8) that allows the free rotation of the main frame (2) with respect to the suspension group (3) along the axis of the hinge (8). The suspension group (3) comprises a pivoting arm (6) for each wheel (25). Each pivoting arm (6) is constrained to the suspension group (3) through the interposition of one or more elastic elements (9) consisting of elastomers. The elastic elements (9) operate as suspension or damping means, or with both of the associated functions. Each elastic element (9) is compressed and works under pressure inside a cavity obtained between one or more pins (7) having a closed polygonal section, operatively associated with the hinge (8), and one or more channels (32) having a closed polygonal section, obtained in the suspension group (3). The closed polygonal section of each channel (32) has a compatible shape and has a larger surface with respect to the closed polygonal section of each pin (7) that rotates inside such a channel (32) having a closed polygonal section.

13 Claims, 12 Drawing Sheets

(51) Int. Cl.
  *B62K 5/08* (2006.01)
  *B62K 5/027* (2013.01)
  *B60G 11/22* (2006.01)
  *B62K 25/04* (2006.01)
  *B62L 1/00* (2006.01)
  *B62K 5/00* (2013.01)

(52) U.S. Cl.
  CPC ............ *B62K 5/08* (2013.01); *B62K 25/04* (2013.01); *B62L 1/00* (2013.01); *B60G 2200/44* (2013.01); *B60G 2202/142* (2013.01); *B60G 2300/122* (2013.01); *B60G 2300/45* (2013.01); *B62K 2005/001* (2013.01)

(58) Field of Classification Search
  CPC ............ B60G 11/225; B60G 2202/142; B60G 2300/45; B60G 2300/122; B60G 2200/44; B62L 1/00
  See application file for complete search history.

(56) References Cited

U.S. PATENT DOCUMENTS

| | | | |
|---|---|---|---|
| 4,903,857 A * | 2/1990 | Klopfenstein | B62K 5/05 280/267 |
| 7,287,621 B2 * | 10/2007 | Kuroki | B62K 5/027 180/210 |
| 8,141,890 B2 | 3/2012 | Hughes et al. | |
| 8,413,295 B2 * | 4/2013 | Campbell | B60B 33/045 16/35 D |
| 8,434,775 B2 * | 5/2013 | Patmont | A61G 5/026 280/250.1 |
| 9,039,018 B1 * | 5/2015 | Lin | B60G 11/24 280/86.5 |
| 2007/0182120 A1 | 8/2007 | Tonoli et al. | |
| 2008/0012262 A1 | 1/2008 | Carabelli et al. | |
| 2008/0116660 A1 * | 5/2008 | Nicholls | A61G 5/1078 280/286 |
| 2015/0290990 A1 * | 10/2015 | Lin | A61G 5/045 280/124.144 |
| 2016/0137251 A1 * | 5/2016 | Mercier | B62D 9/02 180/210 |

* cited by examiner

VEHICLE HAVING THREE OR MORE TILTING WHEELS WITH REACTIVE CONSTRAINT SUSPENSION

TECHNICAL FIELD

The present invention refers to a vehicle having three or more tilting wheels with reactive constraint suspension. The suspension structure object of the present invention is applicable to vehicles having three or more tilting wheels having at least one pair of wheels lying on the same transversal axis.

BACKGROUND

Vehicles having tilting wheels have the wheels arranged on the same transversal axis that pivot about the longitudinal axis of the vehicle, following the inclination of the main frame and of the driver in cornering. The suspension object of the present invention is applicable both at the front, combined with steering wheels, and at the rear, as a simple non-steering suspension group for vehicles having tilting wheels.

Throughout the world there are an ever-increasing number of proposed vehicles having tilting wheels with three or four wheels, used particularly in large cities. Vehicles having tilting wheels currently known can have three or four tilting wheels. In the case of three-wheeled vehicles, in most cases the wheels lying on the same axis are arranged at the front and are thus steering wheels.

Vehicles having tilting wheels currently known can be classified conceptually in the following two categories:
1) vehicles that use suspensions derived from motorcycle technology (telescopic forks or pulled/pushed arms), mounted coupled on a parallelogram structure fixedly connected to the main frame, so that the constraint axis of the suspensions (and therefore the wheel) follows the inclination of the axis of the main frame;
2) vehicles that use suspensions derived from automobile technology (of the articulated quadrilateral or McPherson or double wishbone type), that render the wheels pivoting through suitable tie rods that make a parallelogram structure with the connecting pivoting arm between the wheel hub and the main frame. Also in this way, the wheels follow the angle of inclination of the main frame.

For example, document US 2015/0290990 A1 illustrates a four-wheeled vehicle with front suspension with independent wheels having a constructive scheme of the articulated quadrilateral type. Each front wheel is provided with dampers that comprise elastic elements made of rubber. Each front wheel is also mounted on a respective parallelogram structure fixedly connected to the main frame of the vehicle, as clearly highlighted in FIG. 6 of US 2015/0290990 A1. But the vehicle illustrated in document US 2015/0290990 A1, although falling within the aforementioned category 2, cannot be considered a vehicle having tilting wheels. This is due to the fact that the front suspension group of the vehicle illustrated in document US 2015/0290990 A1 is not free to rotate along the axis of a hinge about the main frame 1. The vehicle illustrated in document US 2015/0290990 A1 has the pivoting front wheels, but it is not a vehicle having tilting wheels.

Another example can be seen in document U.S. Pat. No. 4,360,224, which illustrates a three-wheeled vehicle that is proposed to make this particular type of vehicle more stable during travel. Consequently, the vehicle illustrated in document U.S. Pat. No. 4,360,224 is provided with two tilting front wheels, but the respective front suspension group is in turn provided with a conventional torsion bar with the purpose of keeping the main frame in vertical position both in the absence of the driver and during travel. The presence of a torsion bar at the front axle, as well as constructively complicating the front suspension group of the vehicle, impedes the free inclination during cornering of the vehicle itself, as on the other hand occurs with a normal two-wheeled vehicle or with a vehicle having three or more totally tilting wheels.

Moreover, in the vehicle illustrated in document U.S. Pat. No. 4,360,224 the only damping group that comprises elastic elements made of rubber is used as joining interface between the torsion bar and the pivoting arms. This damping group acts to dampen the stresses of the torsion bar on the pivoting arms, but does not make the condition of independent wheels since, as described and as can be clearly seen in FIG. 4 of document U.S. Pat. No. 4,360,224, the right pivoting arm is connected to the outer body of the damping group, whereas the left pivoting arm is connected to the inner body of the same damping body. The elastic elements between the two bodies of the damping group are shared and therefore the two pivoting arms are not independent, but work on the same elastomers and, furthermore, are both constrained to the torsion bar. The vehicle illustrated in document U.S. Pat. No. 4,360,224, therefore, has the front wheels that are not free to tilt and are not independently dampened.

SUMMARY

In general, vehicles having tilting wheels, whether they have three or four wheels, are currently increasingly present on the market, since they offer characteristics of comfort and particularly active safety appreciably greater than similar two-wheeled models. On the other hand, these features are obtained at the expense of substantial constructive complexity, together with a large number of components that make the construction of this type of vehicle laborious, heavy and economically disadvantageous with respect to conventional two-wheeled vehicles.

The purpose of the present invention is therefore to make a vehicle having three or more tilting wheels with reactive constraint suspension that is capable of overcoming the aforementioned drawbacks of the prior art in an extremely simple, cost-effective and particularly functional manner.

In detail, a purpose of the present invention is to make a vehicle having tilting wheels that is light to manoeuvre, having an extremely simplified suspension structure but with independent wheels and with a reduced number of components.

Another purpose of the present invention is to make a vehicle having tilting wheels having simple construction and maintenance and at the same time excellent dynamic performance and travel comfort.

These and other purposes according to the present invention are accomplished by making a vehicle having three or more tilting wheels with reactive constraint suspension as outlined in claim 1.

Further characteristics of the invention are highlighted by the dependent claims, which are an integral part of the present description.

In the embodiments illustrated hereinafter, the suspension group object of the present invention is applied to a vehicle having three tilting wheels with a pair of steering wheels on the front axle. The innovative idea forming the basis of the present invention is the simplification of the suspension group, obtained so that some elements perform many functions simultaneously.

BRIEF DESCRIPTION OF THE DRAWING FIGURES

The characteristics and advantages of a vehicle having three or more tilting wheels with reactive constraint suspension according to the present invention will become clearer from the following description, given as an example and not for limiting purposes, referring to the attached schematic drawings, in which.

DETAILED DESCRIPTION OF THE INVENTION

Figure 1:
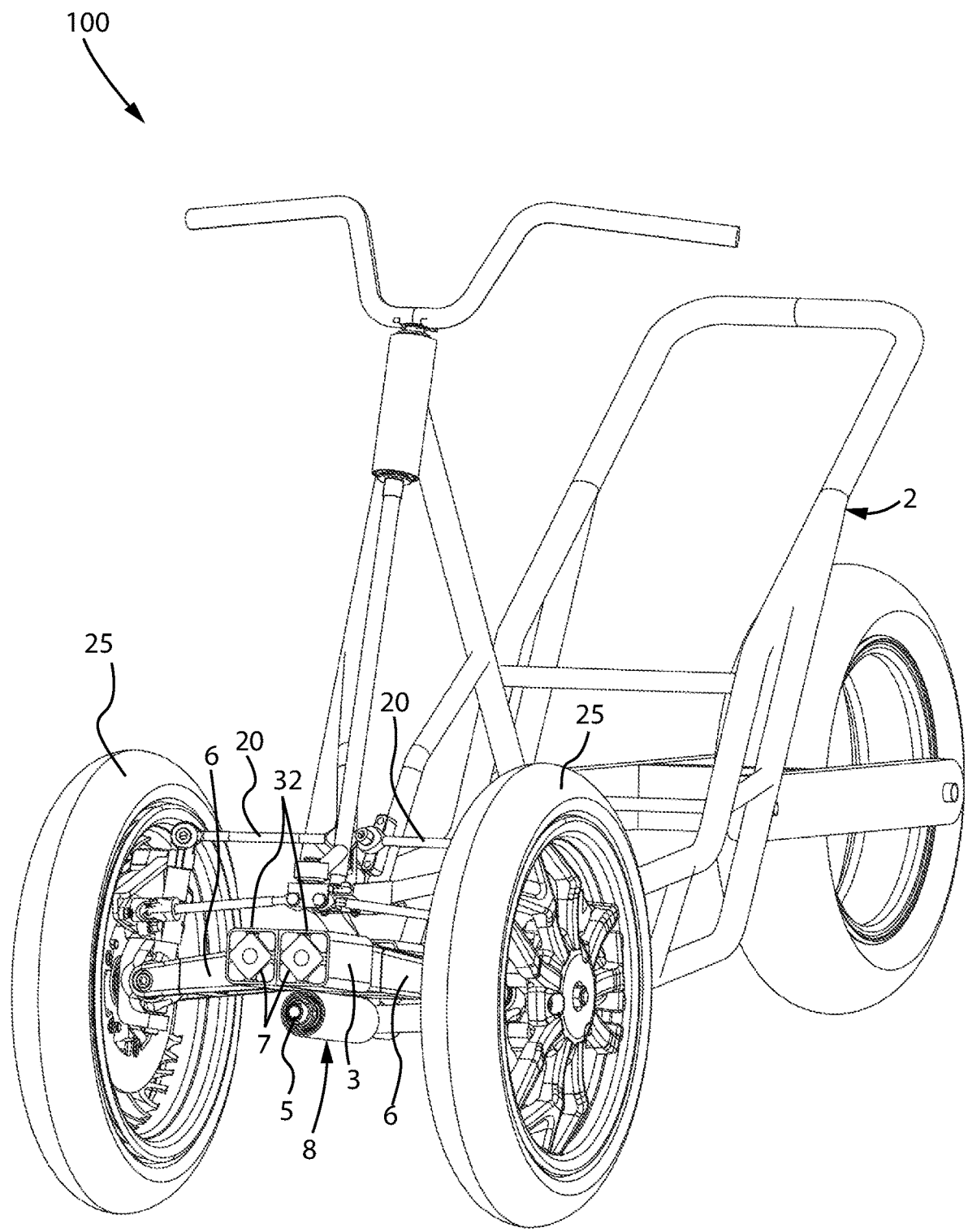
FIG. 1 is a perspective view of a first embodiment of the vehicle having tilting wheels according to the present invention.
Figure 2:
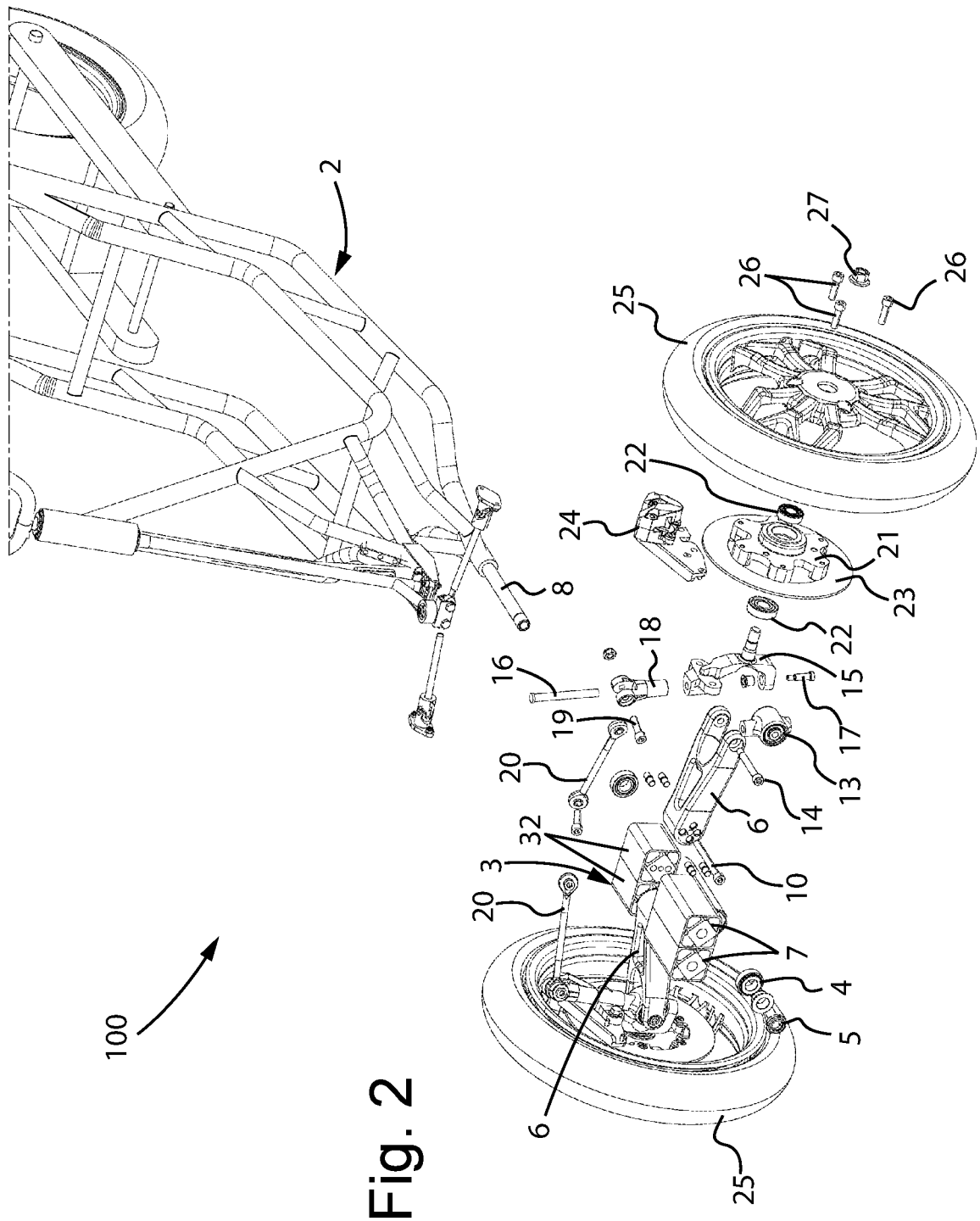
FIG. 2 is a perspective view of the vehicle of FIG. 1, with an exploded view of the components from the side of the left front wheel.
Figure 3:
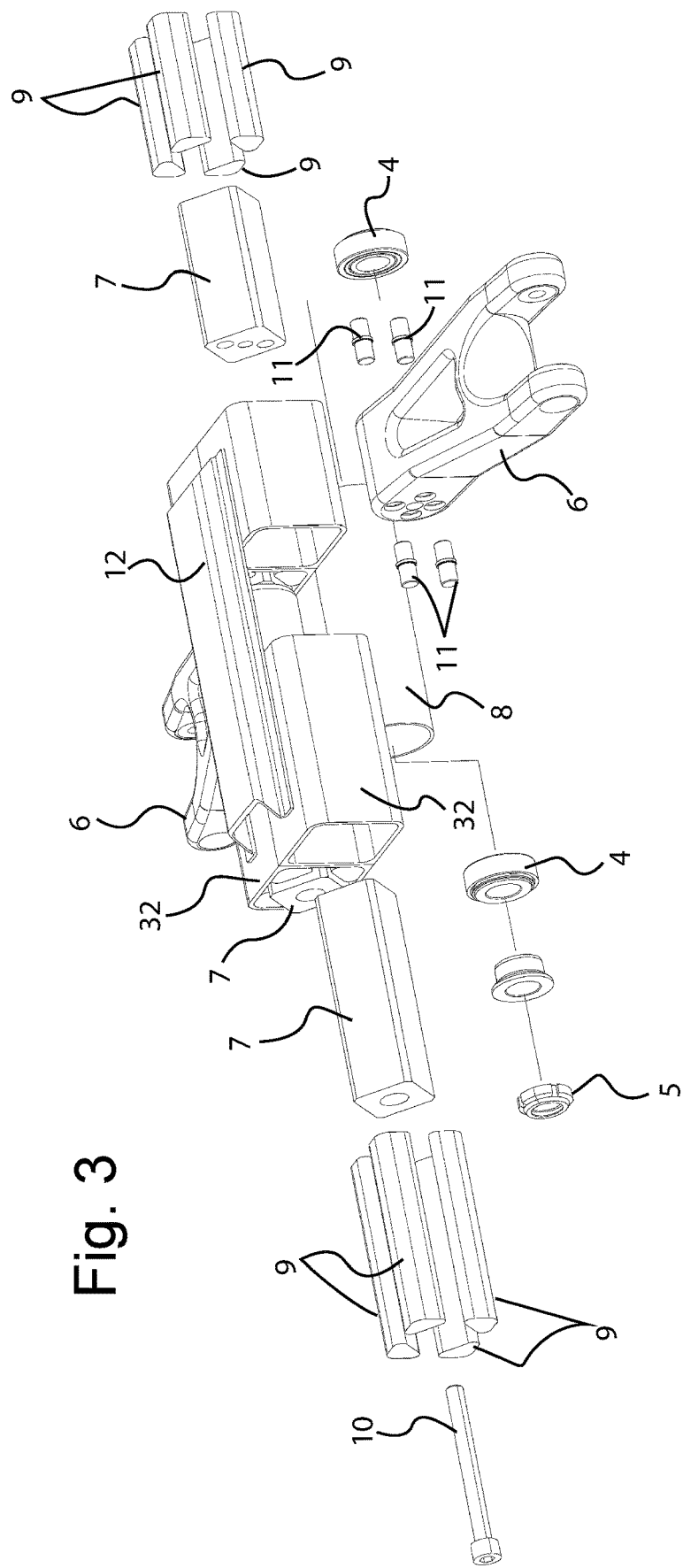
FIG. 3 is an exploded view of only the suspension group of the vehicle of FIG. 1.
Figure 4:
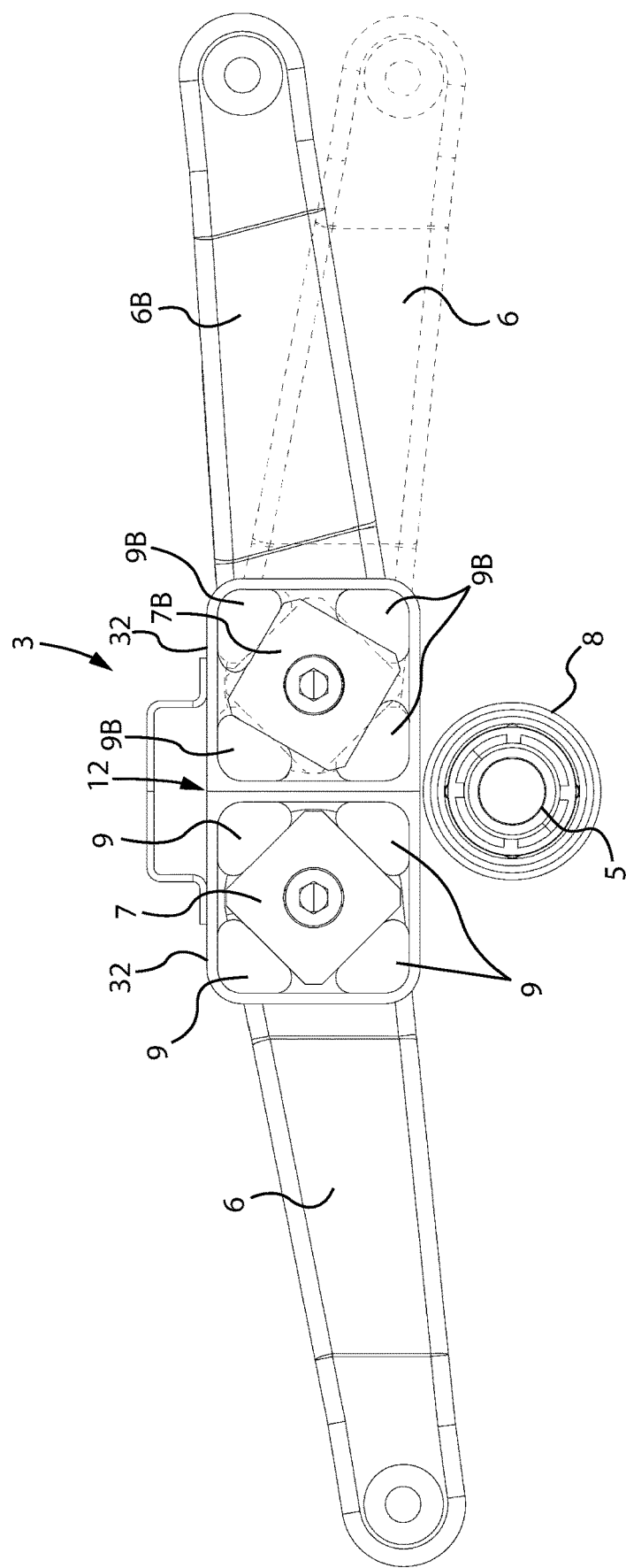
FIG. 4 is a front view of the suspension group of FIG. 3, which shows an example of excursion of the left pivoting arm with respect to the right pivoting arm.

With reference to the figures, two preferred embodiments of the vehicle having tilting wheels with reactive constraint suspension according to the present invention are shown. The vehicle having tilting wheels is globally indicated with reference numeral 100 and comprises a main frame 2 on which the suspension group 3 is hinged.

The suspension group 3 is free to rotate, through respective friction reduction devices 4, along the axis of a pin or hinge 8 of the main frame 2. The suspension group 3 is secured to the pin or hinge 8 of the main frame 2 through a fastening ring 5. The friction reduction devices 4 can, for example, consist of rolling bearings, ball bearings or roller bearings. The friction reduction devices 4 could also consist of simple bushings.

In the embodiment of FIGS. 1-6, two pivoting arms 6 are secured in the suspension group 3 through screws 10 and drive pins 11. In the embodiment of FIGS. 7-12 the pivoting arms 6 are, on the other hand, fixed onto the suspension group 3 through clamps 30 and screws 31, as will be specified more clearly hereinafter. Irrespective of the embodiment, a cruciform joint 13 is housed at the opposite end of the two pivoting arms 6 through a pin 14. A spindle 15 is secured on the cruciform joint 13 through two pins 16 and 17.

A wheel-holding hub 21 is slotted onto a further pin fixedly connected to the spindle 15, said hub 21 being free to rotate on wheel bearings 22 and being secured to the spindle 15 by a central nut 27. The wheel 25 is secured to its hub 21 through screws 26. The spindle 15 can thus rotate about the pivoting arm 6 so as to assist the upward and downward movements of the respective wheel 25. The spindle 15 is also capable of steering to the right and to the left along a steering axis passing through the two pins 16 and 17.

The wheel-holding hub 21 is also the seat of a brake disc 23, which works coupled with a brake caliper 24 in turn fixed onto the spindle 15. The wheels 25 tilt by inclining with the main frame 2 controlled by the camber tie rods 20.

As far as the linkages and the steering control system are concerned, they are substantially similar, in operating principle and components, to those of the most common quads or ATV (acronym of "All Terrain Vehicles") of ordinary production. Therefore, it is not considered necessary to go into the functional details of the linkages and of the steering control system of the vehicle 100.

In the embodiment of FIGS. 1-6 the suspension group 3 comprises a monoblock main body 12, which is the assembly of four hollow housings having a closed polygonal section that form respective channels 32 having a closed polygonal section. These channels 32 having a closed polygonal section are joined to a lower pipe, which is the seat of the bearings 4 of the pin or hinge 8. The main body 12 also comprises an upper stiffening reinforcement.

Inside the main body 12, in the respective channels 32 having a closed polygonal section, four central elements 7 having a closed polygonal section are positioned, having the function of respective pins. The pins 7 having a closed polygonal section are joined in pairs to the two pivoting arms 6 through bolts 10 and are held in position by drive pins 11. This construction makes the pivoting arms 6 fixedly connected to the pins 7 having a closed polygonal section, so that it is not possible to rotate the pivoting arms 6 without at the same time rotating the pins 7 having a closed polygonal section.

The pins 7 having a closed polygonal section are held in the seat in the main body 12 thanks to the mounting interference with one or more elements made of elastomer 9 that are forced in the seat with great interference. In other words, each element made of elastomer 9 is compressed and works under pressure inside a cavity obtained between one or more pins 7 having a closed polygonal section and one or more channels 32 having a closed polygonal section obtained in the suspension group 3, in which the closed polygonal section of each channel 32 has a compatible shape and has a larger surface with respect to the closed polygonal section of each pin 7 that rotates inside such a channel 32 having a closed polygonal section. As can be seen more clearly in FIGS. 3 and 4, the pivoting arms 6 are each constrained to the respective pin 7 having a closed polygonal section and can rotate with such a pin 7 having a closed polygonal section to allow the respective wheel 25 to move in the vertical direction, allowing the roughness of the road surface to be absorbed. As shown in the figures, the pins 7, as well as the respective channels 32, preferably but not exclusively have a quadrangular section, even more preferably square, so as to minimise the size of the suspension group 3.

The pins 7 having a closed polygonal section rotate and are held in the seat in the respective channels 32 having a closed polygonal section of the main body 12 of the suspension group 3, overcoming the resistance of the elements made of elastomer 9, which oppose the rotation. As can be seen more clearly in FIG. 4, the elements made of elastomer 9, pressed between each pin 7 having a closed polygonal section and the respective channel 32 having a closed polygonal section, are in equilibrium when there is no load on the respective wheel 25, like in the pivoting arm 6 facing downwards visible on the left in FIG. 4. Vice-versa, the elements made of elastomer 9 deform under load at the constraint of the opposite pivoting arm 6B, as depicted in the same FIG. 4 on the right.

At the constraint of the pivoting arm 6B the elements made of elastomer 9B are deformed due to the rotation of the pin 7B having a closed polygonal section. The elements made of elastomer 9B thus tend to oppose the rotation to go back into the starting position, in other words into the position in which there is no load on the respective wheel 25.

It should be noted how the torsion of the pivoting arm 6B has deformed and loaded the elements made of elastomer 9B in their seat between each pin 7 having a closed polygonal section and the respective channel 32 having a closed polygonal section. These elements made of elastomer 9B to all intents and purposes behave like a spring. Therefore, in fact, the elements made of elastomer 9 are the elastic part of the suspension group 3 of the vehicle 100, being able to replace the conventional steel springs, the leaf springs or the air springs.

Due to the known property of hysteresis of elastomers stressed under compression, like in this specific case, the elements made of elastomer 9B also act as damper elements, since the return to the initial condition occurs in a controlled manner, preventing the sudden and "unrestricted" return that would happen with a mechanical spring or a leaf spring, without damping element.

It can thus be stated that the pins 7 having a closed polygonal section constitute the constraints of the pivoting arm 6, i.e. being the components that keep it in position. The pins 7 having a closed polygonal section are at the same time reactive components of the suspension group 3, since they are capable of rotating, of absorbing the collisions and the forces acting while the vehicle 100 is traveling, as well as of taking the respective pivoting arm 6 back to initial equilibrium, in a controlled manner, once the stresses have stopped.

These technical characteristics allow the suspension group 3 to operate as a reactive constraint suspension group. It should be noted that each single pivoting arm 6 acts on its own series of elements made of elastomer 9 that are separate and independent from the elements made of elastomer 9 acting on the opposite pivoting arm 6. The vehicle 100 is therefore a vehicle having completely independent wheels. The pivoting arms indeed rotate independently from one another and independently from the rotation of the main frame 2 about the suspension group 3 by means of the hinge 8.

Figure 5:
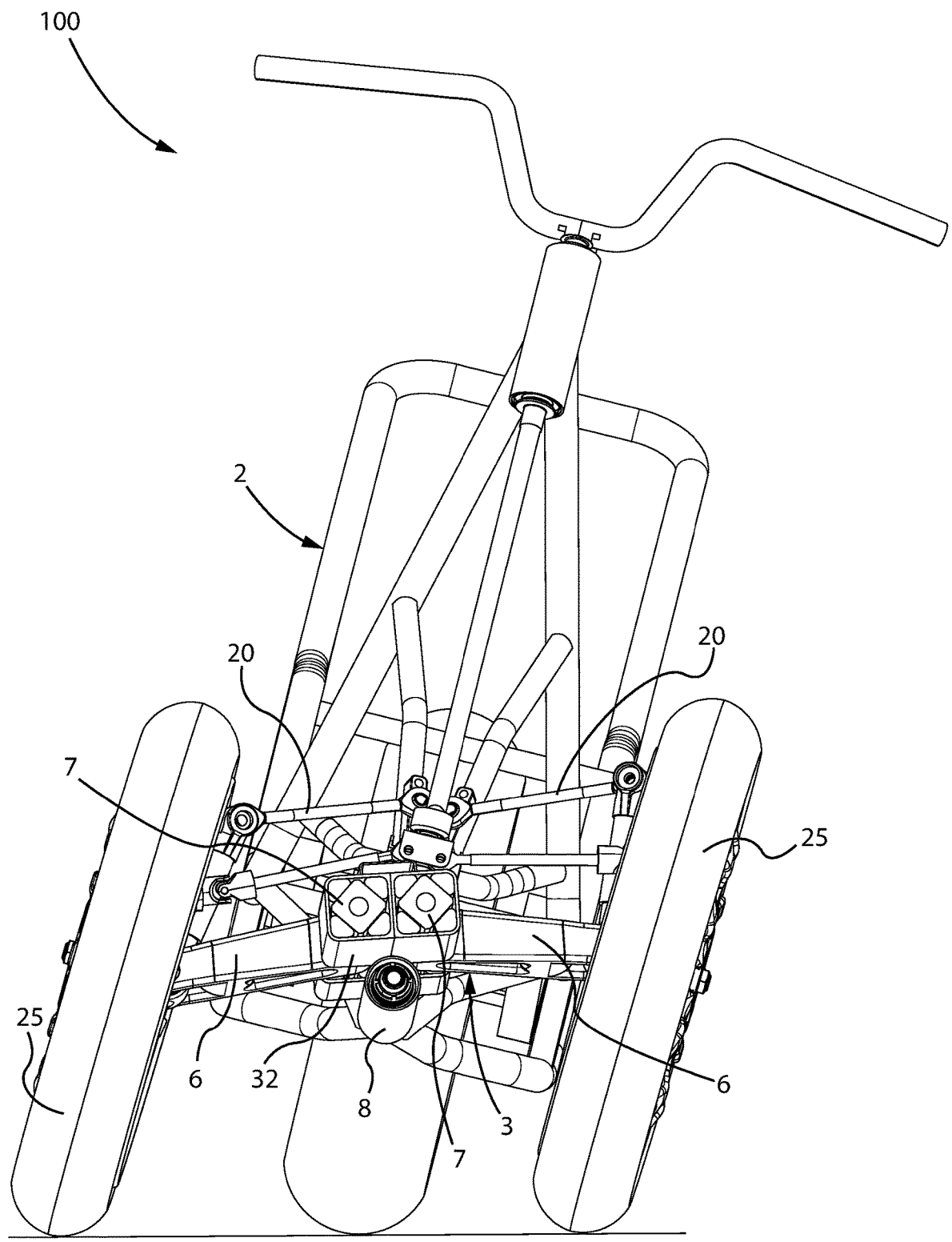
FIG. 5 is a front view of the vehicle of FIG. 1, illustrated with an inclination of $_{20}$° towards the left side.
Figure 6:
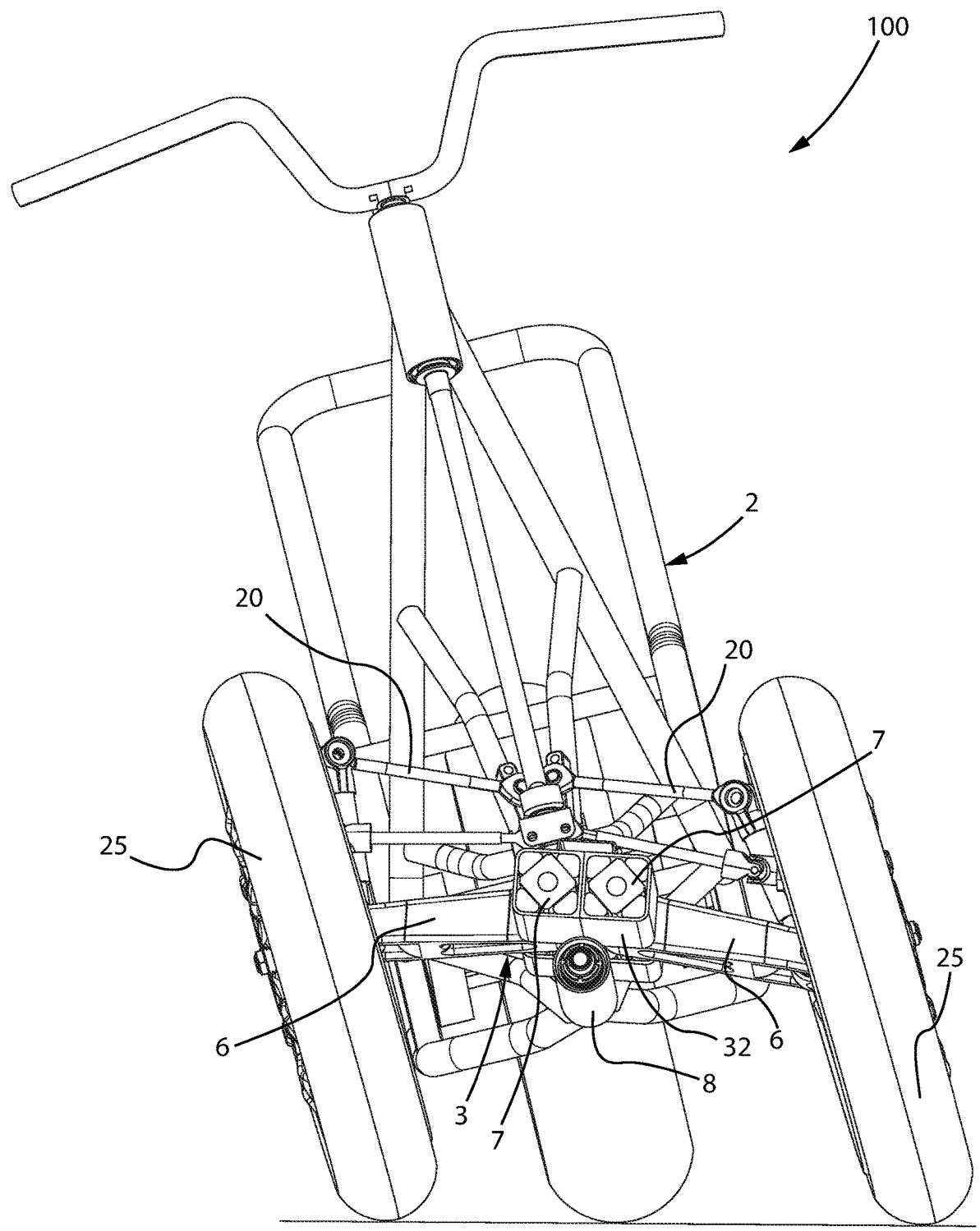
FIG. 6 is another front view of the vehicle of FIG. 1, illustrated with an inclination of 20° towards the right side.
Figure 7:
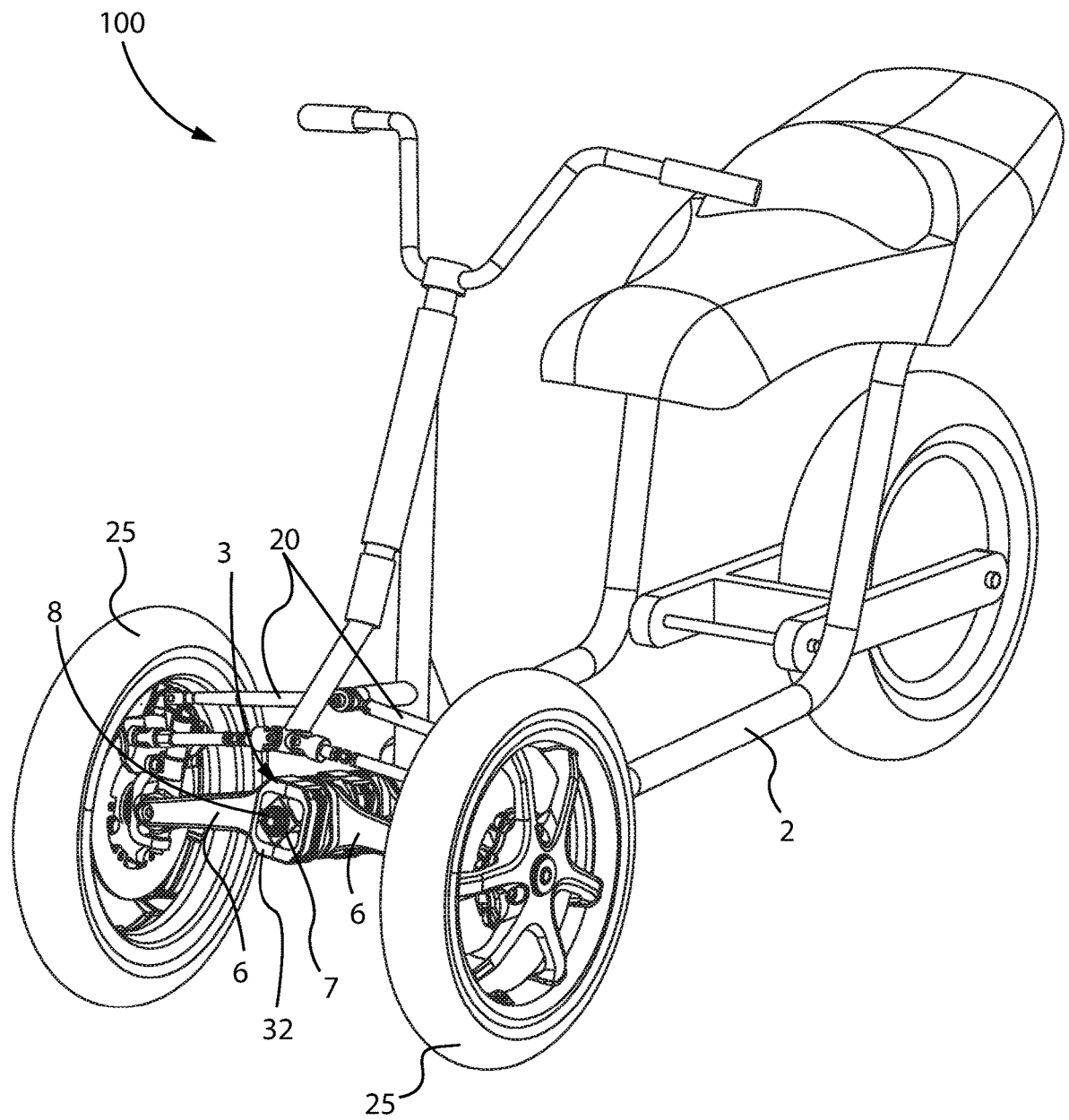
FIG. 7 is a perspective view of a second embodiment of the vehicle having tilting wheels according to the present invention.
Figure 8:
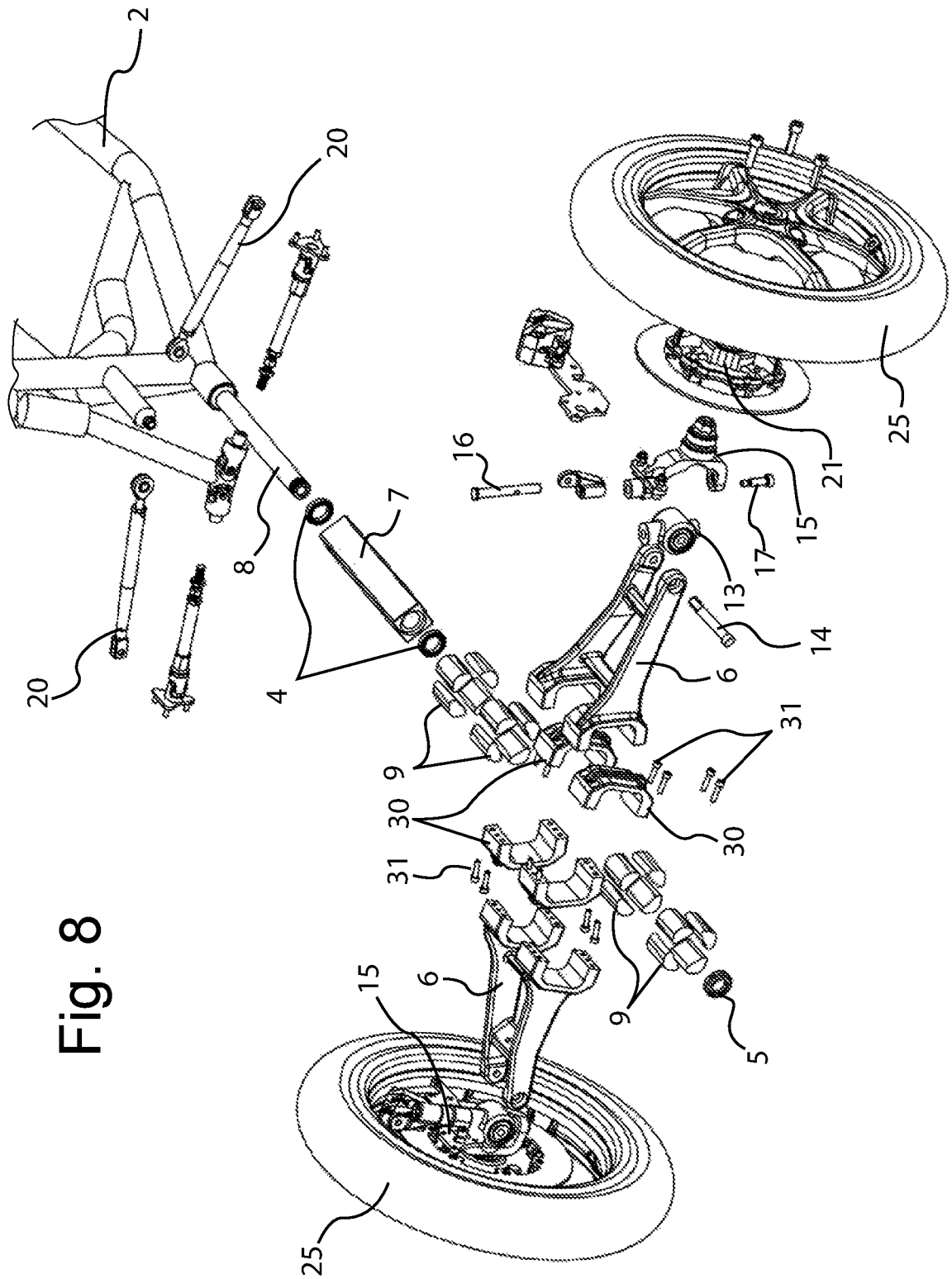
FIG. 8 is an exploded view of the components of the front suspension group of the vehicle of FIG. 7.

FIGS. 5 and 6 illustrate the vehicle 100 tilted, respectively, to the left and to the right, with reference to the direction of travel. Since the main body 12 of the suspension group 3 is hinged to the main frame 2 through the pin or hinge 8, such a main frame 2 is free to rotate along the axis of the pin or hinge 8. This movement is called tilting, and in this case the tilting axis of the vehicle coincides with the axis of the pin or hinge 8.

FIG. 5 shows the vehicle 100 with the main frame 2 inclined by 20° towards the left side, whereas the suspension group 3 remains parallel to the ground. The suspension group 3 thus maintains the possibility of assisting the possible stresses due to the movement of the vehicle 100, independently moving the pivoting arms 6, constrained to the main body 12 by the pins 7 having a closed polygonal section. It should be noted how the wheels follow the tilting of the main frame 2 by means of the camber tie rods 20.

FIGS. 7-12 illustrate a second embodiment of the vehicle 100 having tilting wheels according to the present invention. In this embodiment, the suspension group 3 comprises a single element or pin 7 having a closed polygonal section, arranged longitudinally along a central axis of the vehicle 100. The single element or pin 7 having a closed polygonal section is joined to the main frame 2 through the pin or hinge 8, on which it is free to rotate thanks to the interposition of ball bearings or sliding elements 4. The fastening ring 5 prevents the withdrawal of the single element or pin 7 from the main frame 2.

The single element or pin 7 having a closed polygonal section is also the seat where the elements made of elastomer 9 engage, on which the two pivoting arms 6 of each wheel 25, one for the right suspension and one for the left suspension are secured, in alternate steps. The elastic constraint of the pivoting arms 6 on the single element or pin 7 having a closed polygonal section is carried out through the interposition of the elements made of elastomer 9 and the clamping of one or more clamps 30 for each pivoting arm 6. The clamps 30 compress the elements made of elastomer 9 between the element or pin 7 having a closed polygonal section and the respective channel 32 having a closed polygonal section. In this embodiment, the channel 32 having a closed polygonal section is obtained in part in a shaped end of each pivoting arm 6 and in part in each clamp 30. The fastening of each clamp 30 to the shaped end of the respective pivoting arm 6 takes place by means of screws 31.

Figure 9:
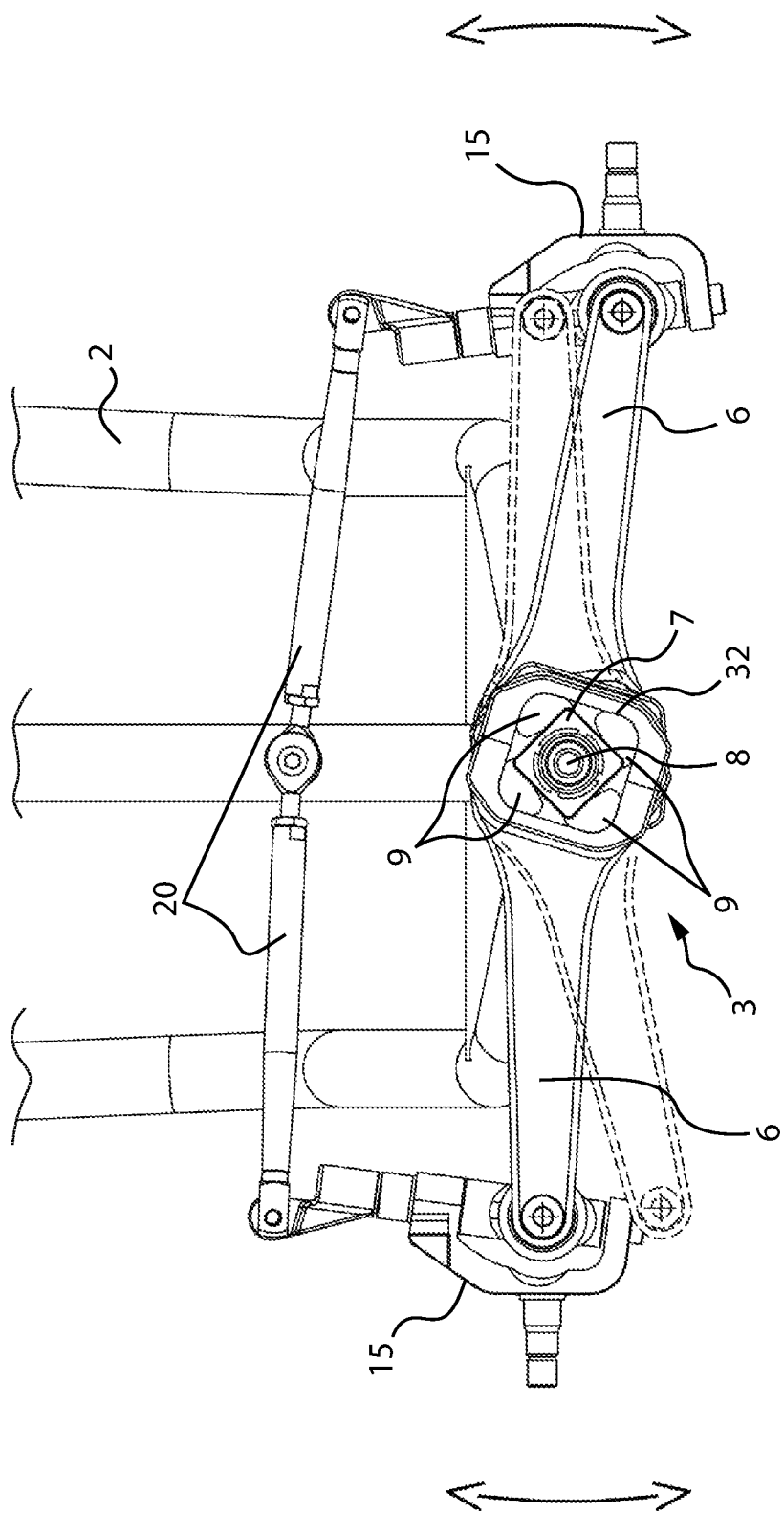
FIG. 9 is a front view of the suspension group of FIG. 8, which shows the independent pivoting movement of the single arms.
Figure 10:
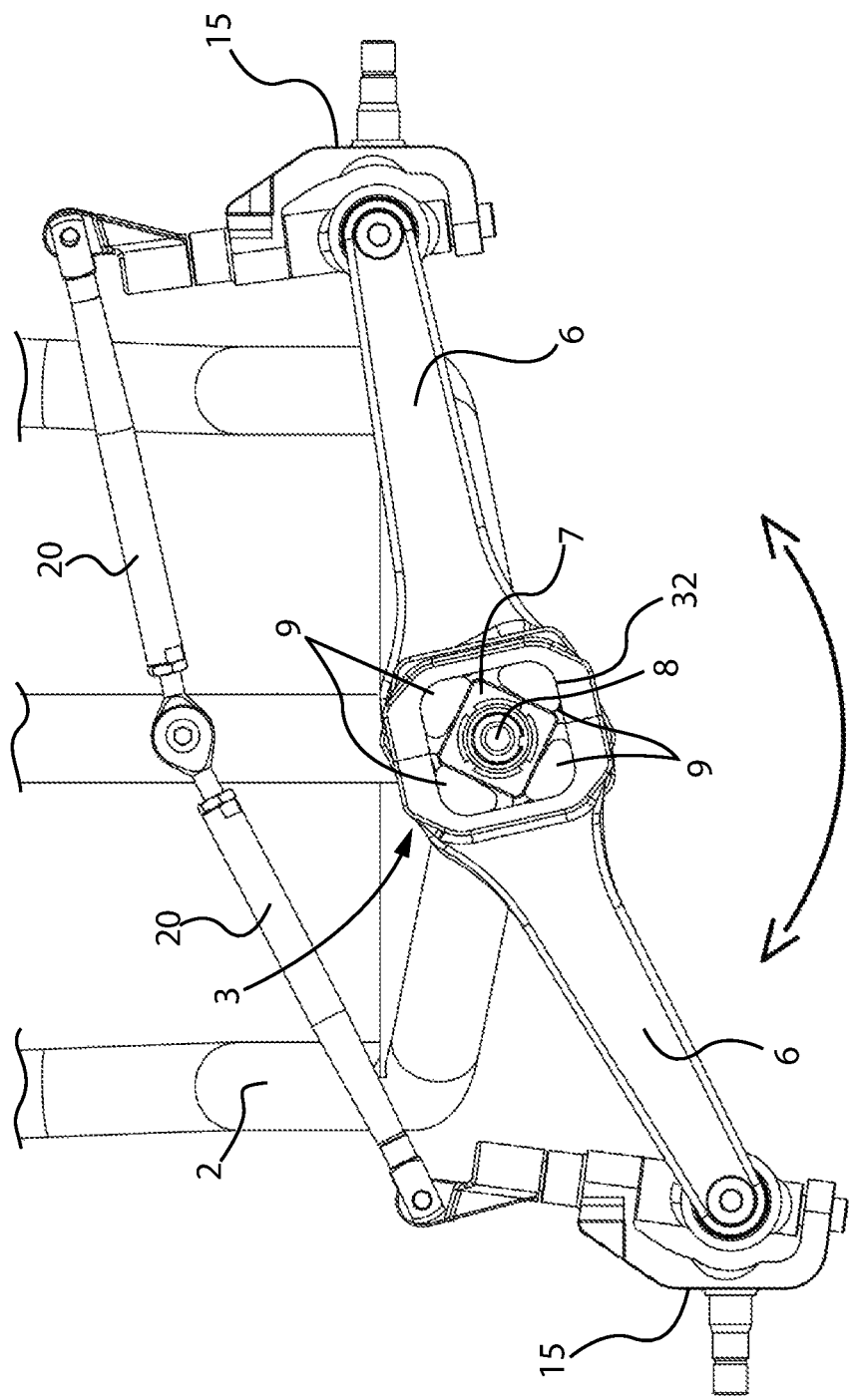
FIG. 10 is another front view of the suspension group of FIG. 8, which shows the pivoting movement of the suspension group around the frame of the vehicle.
Figure 11:
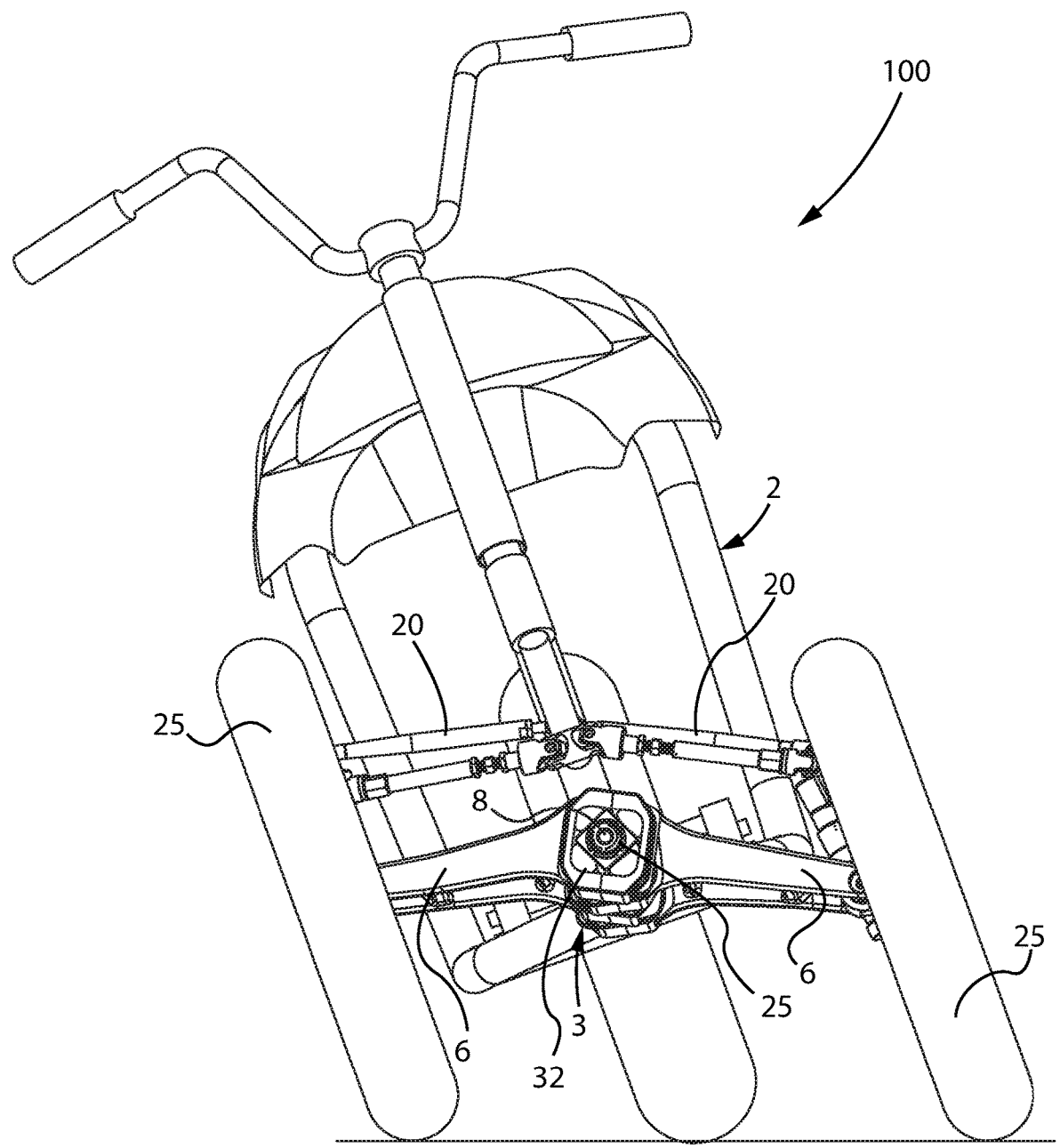
FIG. 11 is a front view of the vehicle of FIG. 7, useful for showing how the pivoting movement allows cornering.
Figure 12:
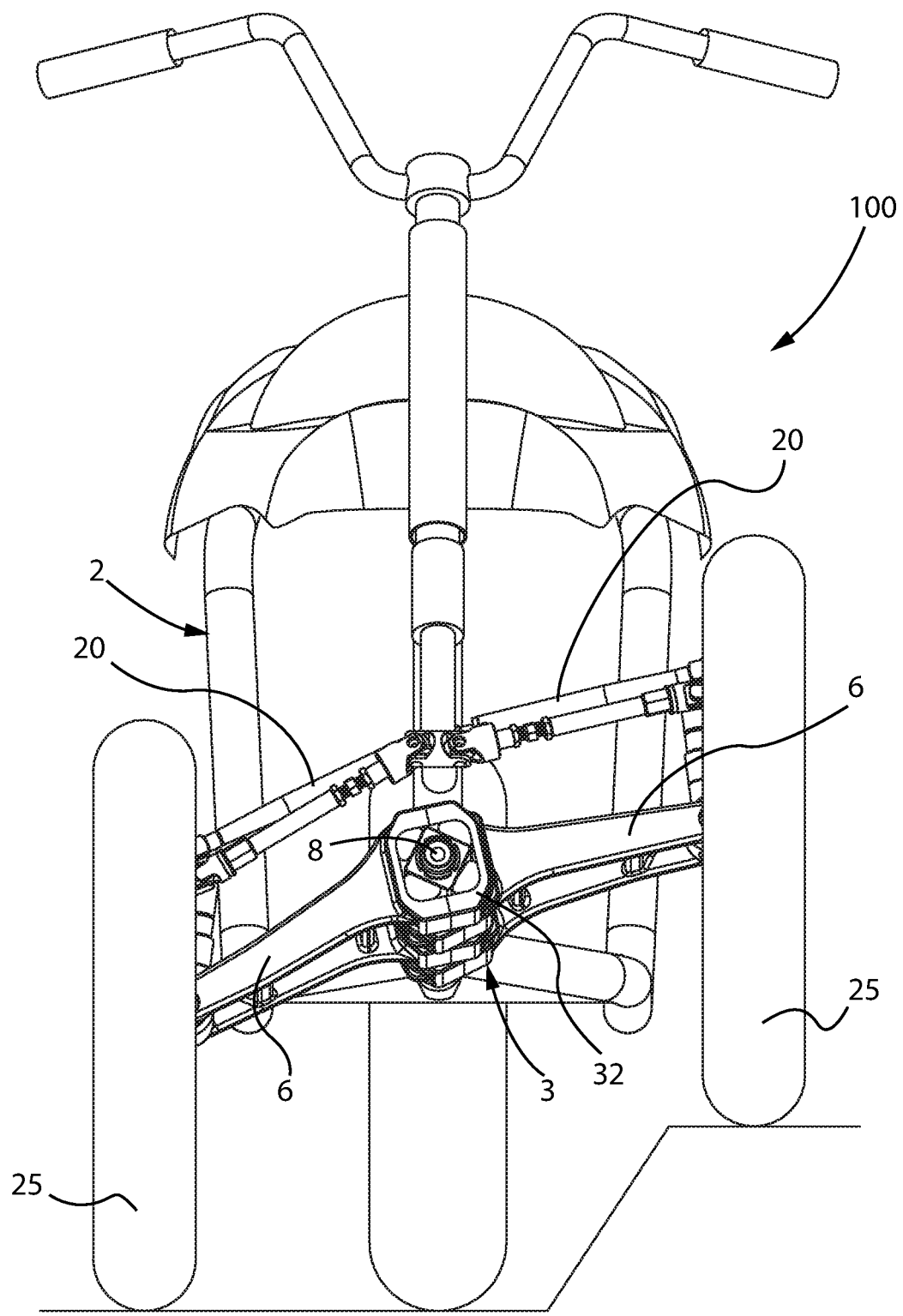
FIG. 12 is another front view of the vehicle of FIG. 7, useful for showing how the pivoting movement allows raised obstacles to be ridden over.

The single element or pin 7 having a closed polygonal section thus constitutes the pin about which the pivoting arms 6 rotate independently from one another, as shown for example in FIG. 9. At the same time, the single element or pin 7 having a closed polygonal section rotates about the main frame 2 through the pin or hinge 8, so as to allow the tilting movement of the vehicle 100 as shown in FIGS. 10, 11 and 12. In other words, on the vehicle 100 illustrated in FIGS. 7-12 the pin about which the left pivoting arm rotates, the pin about which the right pivoting arm rotates and finally the pin about which the entire suspension group rotates with respect to the main frame 2 coincide, making a perfect geometry of the parallelogram.

It should be noted that, also in this embodiment, each single pivoting arm 6 acts on its own series of elements made of elastomer 9 that are separate and independent from the elements made of elastomer 9 acting on the opposite pivoting arm 6. The vehicle 100 is thus a vehicle having completely independent wheels. Also in this embodiment, indeed, the pivoting arms 6 rotate independently from one another and independently from the rotation of the main frame 2 about the suspension group 3 by means of the hinge 8.

It should be noted that, as shown in FIG. 9, the single pivoting arms 6 rotate compressing the elastomers 9 against the single element or pin 7 having a closed polygonal section, which remains stationary with respect to the main frame 2 (condition of absorption of roughness in straight line travel). Differently, to carry out the tilting movement of the vehicle 100, as shown in FIGS. 10, 11 and 12, the single element or pin 7 having a closed polygonal section rotates about the main frame 2 through the pin or hinge 8. While the vehicle 100 travels these two effects add together according to the stresses applied by the driver and by the road surface.

With the exception of the different embodiment of the suspension group 3, as far as the construction and the operation of the other components are concerned, the vehicle 100 illustrated in FIGS. 7-12 is substantially identical to the one illustrated in FIGS. 1-6.

It has thus been seen that the vehicle having three or more tilting wheels with reactive constraint suspension according to the present invention achieves the purposes highlighted earlier. Indeed, a suspension group for vehicles having tilting wheels with damped system having independent wheels has indeed been made that does not require the use of steel or air springs, or the use of oil for any function.

The suspension group object of the present invention allows an excursion of the wheels without mechanical end stroke in both directions (compression and extension). The non-suspended masses, of elastic elements and dampers, are practically zero. The masses of pivoting arm and of the tie rods are low and concentrated around the tilting axis. The suspension group object of the present invention is therefore constructively simple and extremely light.

The combination of these features allows a vehicle to be made with high-level dynamic qualities and comfort, with very low industrial costs, given the number of components. It should be noted that all of the components described and illustrated here, with the exception of just the brake caliper, are identical if used on the right or on the left of the front axle, thus maximising the economy of design and simplifying the management of technical assistance. The fact that oil is not used for any function, as on the other hand always occurs in the construction of conventional dampers, finally constitutes a further advantage from the environmental point of view.

The vehicle having three or more tilting wheels with reactive constraint suspension of the present invention thus conceived can in any case undergo numerous modifications and variants, all of which are covered by the same inventive concept; moreover, all of the details can be replaced by technically equivalent elements. In practice, the materials used, as well as the shapes and sizes, can be whatever according to the technical requirements.

The scope of protection of the invention is therefore defined by the attached claims.

The invention claimed is:

1. Vehicle (100) with three or more tilting wheels, comprising a main frame (2) provided with a suspension group (3) for at least two wheels (25), wherein the suspension group (3) is joined to the main frame (2) through a hinge (8) that allows the free rotation of said main frame (2) with respect to said suspension group (3) along the axis of said hinge (8), wherein the suspension group (3) comprises a pivoting arm (6) for each wheel (25), wherein each pivoting arm (6) is constrained to the suspension group (3) through the interposition of one or more elastic elements (9) consisting of elastomers, said elastic elements (9) operating as suspension or damping means or with both of the associated functions, wherein each elastic element (9) is compressed and works under pressure inside a cavity obtained between one or more pins (7) having a closed polygonal section, operatively associated with said hinge (8), and one or more channels (32) having a closed polygonal section, obtained in the suspension group (3), wherein the closed polygonal section of each channel (32) has a compatible shape and has a larger surface with respect to the closed polygonal section of each pin (7) that rotates inside said channel (32) having the closed polygonal section, and wherein each single pivoting arm (6) acts on its own series of elastic elements (9) that are separate and independent from the elastic elements (9) acting on an opposite pivoting arm (6), so that the pivoting arms (6) rotate independently from one another and independently from the rotation of the main frame (2) about the suspension group (3) by the hinge (8), said hinge (8) comprising a single pin that allows the rotation of the main frame (2) by friction reduction devices (4), with respect to the suspension group (3).

2. Vehicle (100) according to claim 1, wherein the friction reduction devices (4) consist of rolling bearings, ball bearings, roller bearings or bushings.

3. Vehicle (100) according to claim 1, wherein a cruciform joint (13) is housed at an end of each pivoting arm (6) opposite a respective attachment fixed on the rotary pin (7) through a pin (14), wherein a spindle (15) is secured on the cruciform joint (13) through two pins (16, 17), and wherein the pin of the spindle (15) has a wheel-holding hub (21) slotted on it that is free to rotate on wheel bearings (22) and is secured to the spindle (15) by a central nut (27), said spindle (15) thus being able to rotate around the pivoting arm (6) so as to assist the upwards and downwards movements of the wheel (25), said spindle (15) also being capable of steering to the right and to the left along the steering axis passing through said two pins (16, 17).

4. Vehicle (100) according to claim 3, wherein the wheel-holding hub (21) is also the seat of a brake disc (23) that works coupled with a brake caliper (24), in turn fixed onto the spindle (15), wherein the wheels (25) tilt by inclining with the main frame (2) controlled by camber tie rods (20).

5. Vehicle (100) according to any claim 1, wherein the suspension group (3) comprises:
a monoblock main body (12), which is the assembly of four hollow housings having a closed polygonal section that form respective channels (32) and that are joined to a lower pipe, wherein said lower pipe is the seat of the friction reduction devices (4) of the hinge (8); and
an upper stiffening reinforcement,
wherein inside the four channels (32) of said main body (12) four respective rotary pins (7) having a closed polygonal section are positioned, which are joined in pairs to the two pivoting arms (6) through bolts (10) and which are kept in position by drive pins (11), the pivoting arms (6) being fixedly connected to said four rotary pins (7) having the closed polygonal section so that it is not possible to rotate said pivoting arms (6) without at the same time rotating said four pins (7) having the closed polygonal section.

6. Vehicle (100) according to claim 5, wherein said four pins (7) having the closed polygonal section are held in the seat in the main body (12) through mounting interference with the elastic elements (9) that are forced into the seat with great interference.

7. Vehicle (100) according to claim 5, wherein the pivoting arms (6) are each constrained to the respective pins (7) having the closed polygonal section and rotate with them to allow the respective wheel (25) to move in the vertical direction, allowing the roughness of the road surface to be absorbed, wherein said pins (7) having the closed polygonal section rotate and are kept in the seat in the main body (12), overcoming the resistance of the elements made of elastomer (9) that oppose the rotation.

8. Vehicle (100) according to claim 5, wherein the elements made of elastomer (9), pressed in the main body (12), are in equilibrium when there is no load on the respective wheel (25), whereas they deform under load due to the rotation of the respective pin (7) having the closed polygonal section, tending to oppose the rotation to go back to the starting position, the torsion of each pivoting arm (6) deforming and thus loading the elements made of elastomer (9) in their seat, which to all intents and purposes behave like a spring.

9. Vehicle (100) according to claim 1, wherein the suspension group (3) comprises a single pin (7) having the closed polygonal section, arranged longitudinally along a central axis of the vehicle (100) and joined to the main frame (2) through the hinge (8), wherein said single pin (7) having the closed polygonal section is the seat where the elements made of elastomer (9) engage, on which the pivoting arms (6) of each wheel (25) are secured to rotate independently from each other about said single pin (7) having the closed polygonal section, said single pin (7) having the closed polygonal section rotating simultaneously about the main frame (2) through the hinge (8) to allow the tilting movement of the vehicle (100).

10. Vehicle (100) according to claim 9, wherein said vehicle (100) comprises one or more clamps (30) for each pivoting arm (6), said clamps (30) compressing the elements made of elastomer (9) between said single pin (7) having the closed polygonal section and the respective channel (32) having the closed polygonal section, so as to elastically constrain the pivoting arms (6) on said single pin (7) having the closed polygonal section through the interposition of said elements made of elastomer (9).

11. Vehicle (100) according to claim 10, wherein said channel (32) having the closed polygonal section is obtained in part, in a shaped end of each pivoting arm (6) and in part in each clamp (30), wherein each clamp (30) is fixed to said shaped end of the respective pivoting arm (6) by screws (31).

12. Vehicle (100) according to claim 1, wherein said elastic elements (9) are manufactured from rubber or derivatives.

13. Vehicle (100) according to claim 1, wherein said pins (7), as well as the respective channels (32), have a quadrangular section.

* * * * *